US007172103B2

(12) United States Patent
Fujiyama et al.

(10) Patent No.: US 7,172,103 B2
(45) Date of Patent: Feb. 6, 2007

(54) FASTENER MAGAZINE OF FASTENING MACHINE

(75) Inventors: Takeo Fujiyama, Tokyo (JP); Junichi Tamura, Tokyo (JP)

(73) Assignee: Max Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/491,047

(22) PCT Filed: Oct. 3, 2002

(86) PCT No.: PCT/JP02/10335

§ 371 (c)(1),
(2), (4) Date: Sep. 24, 2004

(87) PCT Pub. No.: WO03/031124

PCT Pub. Date: Apr. 17, 2003

(65) Prior Publication Data

US 2005/0017050 A1 Jan. 27, 2005

(30) Foreign Application Priority Data

Oct. 3, 2001 (JP) ............................. 2001-307518

(51) Int. Cl.
*B25C 1/04* (2006.01)

(52) U.S. Cl. ...................... 227/120; 227/136; 227/135; 227/107

(58) Field of Classification Search ................ 227/120, 227/107, 109, 136, 135; 81/434, 435
See application file for complete search history.

(56) References Cited

U.S. PATENT DOCUMENTS 3,471,008 A 10/1969 Reich et al.

(Continued)

FOREIGN PATENT DOCUMENTS

DE 44 06 556 C1 8/1995

(Continued)

OTHER PUBLICATIONS

European Search Report issued in an application corresponding to US 2005/0043106.

(Continued)

*Primary Examiner*—Brian Nash
(74) *Attorney, Agent, or Firm*—Buchanan Ingersoll & Rooney PC

(57) ABSTRACT

A fastener magazine of, e.g., an electric screwdriver into which connected fasteners of various girths can be loaded to improve the versatility. A fastener magazine (5) of a fastening machine has therein a press plate (9) of spring-pressing type opposed to feed pawl (8) of a fastener feed mechanism. The pressing plate (9) is disposed at a height at which the connecting belt (B) of the connected screws (S) is placed and presses the shafts of the connected screws (S) against the wall face of the feed pawl (8) side. The connecting belt (B) is placed on the top face of the pressing plate (9) and supported. The fastener passage is so broad that even thick fasteners can be loaded, and therefore screws of various girths can be held at predetermined heights. Since the connected screws (S) are pressed against the wall face of the feed pawl (8) side, the engagement between the feed pawl (8) and the connected screws (S) is stable, and resultantly the reliability of screw feed is improved.

5 Claims, 9 Drawing Sheets

U.S. PATENT DOCUMENTS

| | | | |
|---|---|---|---|
| 3,930,297 A * | 1/1976 | Potucek et al. | 29/431 |
| 3,945,551 A * | 3/1976 | Sato et al. | 227/136 |
| 4,367,837 A * | 1/1983 | Manino | 227/136 |
| 5,240,161 A * | 8/1993 | Kaneko | 227/109 |
| 5,626,274 A * | 5/1997 | Shkolnikov et al. | 227/109 |
| 5,733,085 A | 3/1998 | Shida et al. | |
| 5,897,046 A * | 4/1999 | Oehri et al. | 227/119 |
| 5,975,399 A * | 11/1999 | Oehri et al. | 227/120 |
| 6,109,146 A * | 8/2000 | Muro | 81/434 |
| 6,173,877 B1 * | 1/2001 | Wingert | 227/109 |
| 6,598,777 B2 * | 7/2003 | Osuga et al. | 227/136 |
| 6,708,861 B2 * | 3/2004 | Osuga et al. | 227/120 |
| 6,763,991 B2 * | 7/2004 | Hamano | 227/135 |
| 6,808,101 B2 * | 10/2004 | Laubach et al. | 227/109 |
| 6,837,414 B1 * | 1/2005 | Chou | 227/109 |
| 6,902,092 B2 * | 6/2005 | Osuga et al. | 227/119 |
| 2005/0043106 A1 | 2/2005 | Fujiyama et al. | |

FOREIGN PATENT DOCUMENTS

| | | |
|---|---|---|
| EP | 0 893 204 A1 | 1/1999 |
| JP | 64-23369 | 2/1989 |
| JP | 185263/1985 | 2/1989 |
| JP | 5-63776 | 8/1993 |
| JP | 16970/1989 | 8/1993 |
| JP | 5-74774 | 10/1993 |
| JP | 27470/1990 | 10/1993 |
| JP | 7-266247 | 10/1995 |
| JP | 2570701 | 2/1998 |
| JP | 3284531 | 3/2002 |

OTHER PUBLICATIONS

International Search Report issued in corresponding application PCT/JP02/10335.

International Search Report issued in an application corresponding to US 2005/0043106.

* cited by examiner

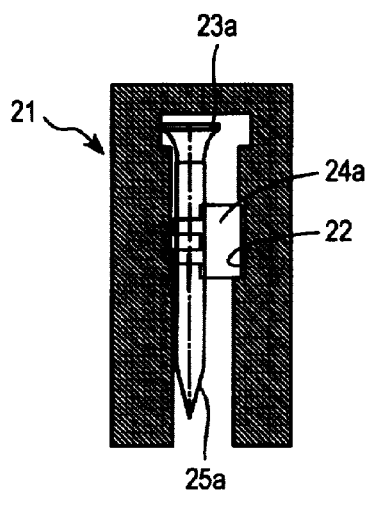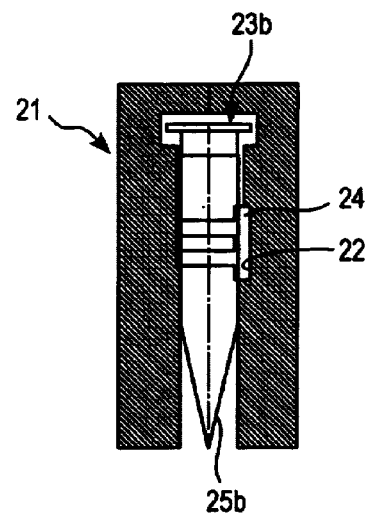

FASTENER MAGAZINE OF FASTENING MACHINE

FIELD OF THE INVENTION

The present invention relates to a fastener magazine of a fastening machine such as a screw fastening machine and a nail driving machine. In particular, it relates to a fastener magazine capable of dealing with screws and nails having various kinds of sizes.

BACKGROUND

There is a screw fastening machine and a nail driving machine using a connecting fastener with a plurality of fasteners such as screws and nails disposed in parallel and connected on a sheet as is well known. According to this kind of the fastening machine, a fastener magazine is attached on the rear surface of a nose so that the connecting fasteners loaded in the fastener magazine are supplied successively into the nose per one cycle operation by a feed pawl of a fastener feeding mechanism interlocked with the lifting and lowering operation of the driver in order to continuously fasten the screws or drive the nails. The cross sectional shape of the fastener passage in the fastener magazine is a T-shape, and it is formed such that the fastener head is placed in the upper wide width part of the T-shaped space and the lower surface of the fastener head is supported by the wide width part so as to guide the connecting fastener in a suspended state.

Moreover, concerning a screw fastening machine using a connecting screw, the official gazette of the Japanese Patent Application Laid Open (JP-A) No. 7-266247 is known. FIG. 3 of the official gazette discloses a structure of a guide part for guiding a connecting screw by supporting the both sides of a connecting belt for connecting the screws from the lower side. In addition thereto, there are the official gazette of the U.S. Pat. No. 2,570,701, and the official gazette of the U.S. Pat. No. 3,284,531 applied by the present inventor.

The fastener magazine having the configuration of supporting the lower surface of the head of the fastener cannot support the head of the fastener having a head diameter smaller than the size of the narrow width part of the lower part in the fastener passage so that the fastener is dropped, and thus it cannot be used, and a problem is involved in that the size range of the usable fastener is narrow. Moreover, a problem is also involved in that the height required to support the fastener differs if the head shape differs such as the flat head and the pan head.

Accordingly, the technological problem to be solved arises in that the connecting fasteners having various thickness should be loaded in the fastener magazine, and the connecting fastener should be supported at a constant height, and an object of the present invention is to solve the above-mentioned problem.

SUMMARY

The present invention is proposed for achieving the above-mentioned object, and it proposes a fastener magazine of fastening machine for loading a connecting fastener having a plurality of fasteners such as screws and nails arranged in parallel on a connecting belt, wherein a pressing member of a pressing type is provided opposed to a feed pawl of a fastener feeding mechanism mounted on the fastener magazine across a fastener passage, the pressing member presses the shaft part of the connecting fastener so as to elastically contact the connecting fastener with the wall surface on the feed pawl side, and the connecting fastener is supported such that the connecting belt of the connecting fastener is placed on the upper surface of the pressing member.

Moreover, it provides the fastener magazine of a fastening machine according to a first aspect of the present invention, wherein a nonreturn pawl to be fitted in the gap between the shaft parts of the fasteners is provided in the pressing member so as to prevent backward movement of the connecting fastener.

Moreover, it provides a fastener magazine of a fastening machine, wherein a pressing member of a pressing type is provided opposed to a feed pawl of a fastener feeding mechanism mounted on the fastener magazine across a fastener passage, the pressing member presses the connecting belt of the connecting fastener so as to elastically contact the connecting fastener with the wall surface on the feed pawl side.

Moreover, it provides a fastener magazine of a fastening machine, wherein a guide groove is formed in the front and rear direction in the wall surface of the fastener passage so as to be supported by engaging the connecting belt with the guide groove.

A fastener magazine of a fastening machine according to a fifth aspect of the present invention is the fastener magazine of a fastening machine according to a third and fourth aspect of the present invention, wherein there is provided a nonreturn member to be engaged with the connecting belt of the connecting fastener for preventing the backward movement of the connecting fastener in the fastener passage.

A fastener magazine of a fastening machine according to a sixth aspect of the present invention is a fastener magazine of a fastening machine for loading a connecting fastener having a plurality of fasteners such as screws and nails arranged in parallel on a connecting belt, wherein a pressing member to be contacted with the connecting belt of the connecting fastener is provided on the side wall of the fastener passage, and a nonreturn member to be engaged with the connecting fastener for preventing the backward movement of the connecting fastener is provided in the pressing member.

A fastener magazine of a fastening machine according to a seventh aspect of the present invention is a fastener magazine of a fastening machine for loading a connecting fastener having a plurality of fasteners such as screws and nails arranged in parallel on a connecting belt, wherein a feed pawl of a fastener feeding mechanism to be engaged with the shank of the connecting fastener or the connecting belt, and the pressing member to be contacted with the connecting belt of the connecting fastener are disposed at the positions facing with each other across the connecting fastener.

A fastener magazine of a fastening machine according to an eighth aspect of the present invention, wherein the feed pawl diverges so as to have a bifurcated shape, and is engaged with the fastener so as to cross the connecting belt.

BRIEF DESCRIPTION OF THE DRAWINGS

FIG. 7 shows a fastener magazine; (a) is an explanatory diagram for a state in which a thin connecting screw is loaded, and (b) is an explanatory diagram for a state in which a thick connecting screw mounted.

DETAILED DESCRIPTION OF PREFERRED EMBODIMENTS

Figure 1:
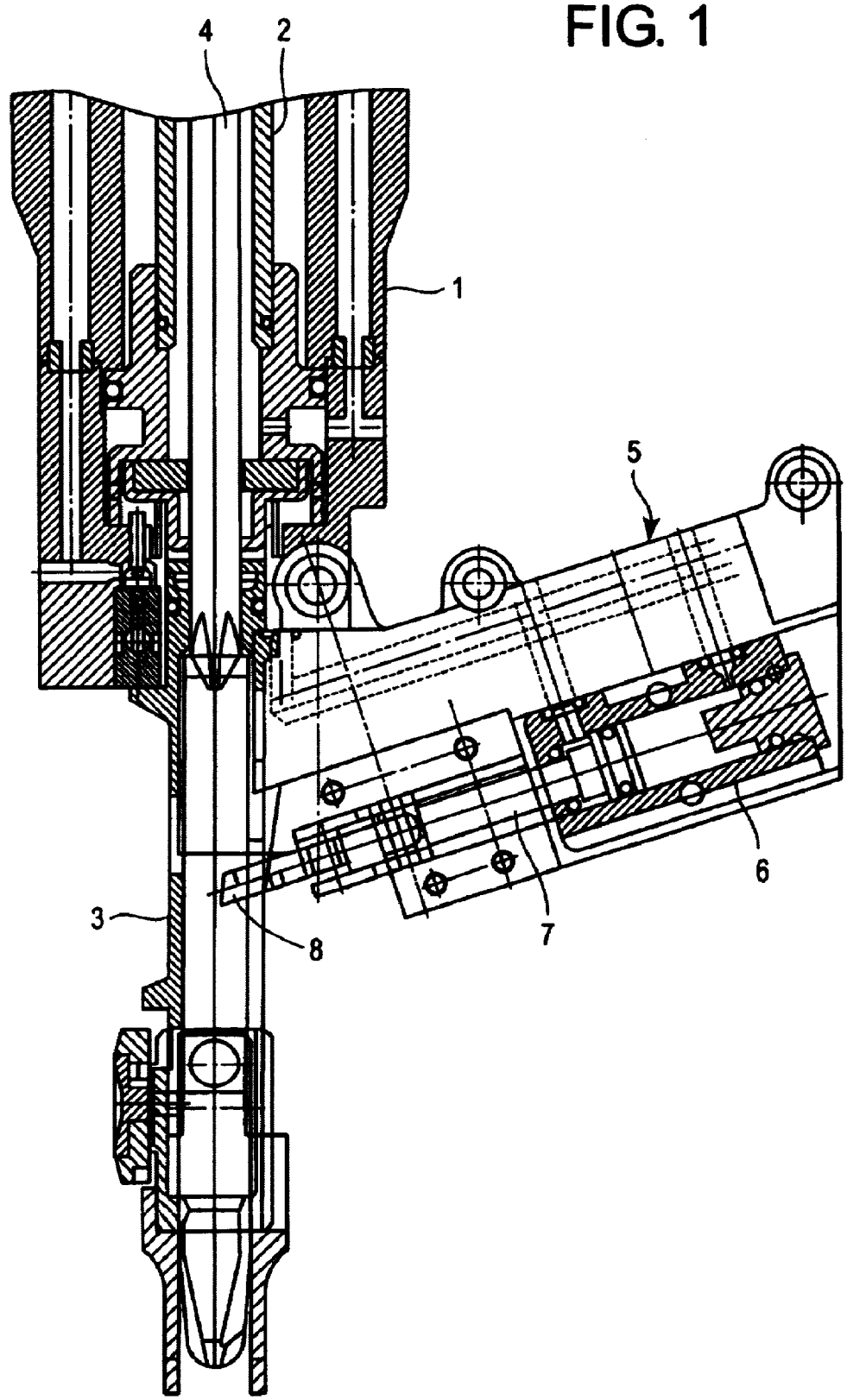
FIG. 1 shows an embodiment of the present invention as a partial cross sectional view of an air impact driver.

Hereinafter, an embodiment of the present invention will be explained with reference to the drawings. FIG. 1 shows the top end part of the air impact driver. The numeral 1 is a cylinder housing, 2 is an air cylinder, 3 is a nose, and 4 is a driver bit, with a fastener magazine 5 mounted on the rear surface of the nose 3. Although it is not shown in the figure, an air impact mechanism to be driven by an air motor is disposed in the upper part of the cylinder housing 1, and a piston of the air cylinder 2 is coupled with a spline shaft interlocked with the air impact mechanism. The driver bit 4 is coupled to the front side of the piston, and when the trigger lever is pulled, the piston and the driver bit 4 are lowered in the air cylinder 2 while being rotated and driven by the air impact mechanism in order to fasten the connecting screw fed in the nose 3 into an object to be screwed.

Figure 2A:
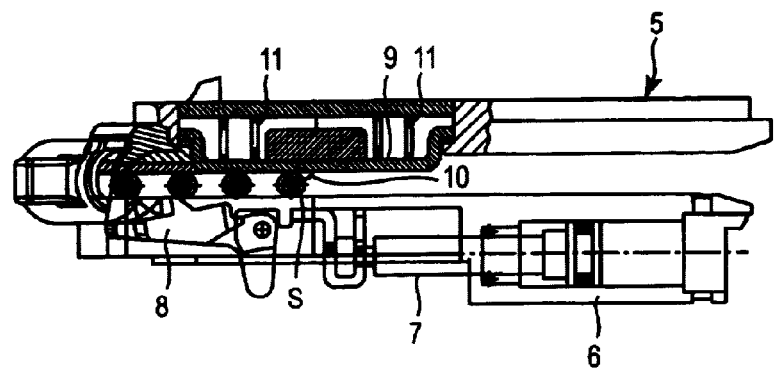
FIG. 2 shows a fastener magazine; (a) is a plan cross sectional view, and (b) is a side view.
Figure 2B:
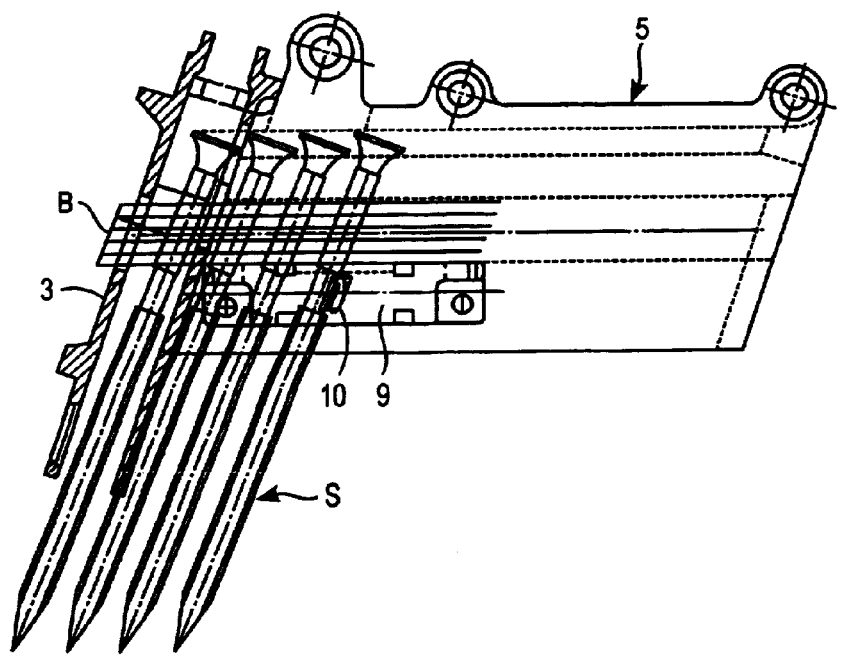

As shown in FIG. 1 and FIG. 2(a), an air cylinder 6A of a spring offset type is disposed on the side surface of the fastener magazine 5, and a feed pawl 8 of a ratchet type is mounted on the tip end of a piston rod 7 of the air cylinder 6. When the air cylinder 2 and the air motor are activated, the high pressure air is supplied to the air cylinder 6 so that the piston rod 7 and the feed pawl 8 are moved backward. Further, when the driver bit 4 moves upward to the initial position after completing the screw fastening operation, the pressured air in the air cylinder 6 is discharged, and the piston rod 7 and the feed pawl 8 are advanced by a spring. At the time, the feed pawl 8 forced in the direction of the connecting screw S by the spring (not shown) enters into the gap between the screws so as to feed the connecting screw S forward, so that the top screw of the connecting screw S is loaded into the nose 3 as shown in FIG. 2(b).

Figure 3A:
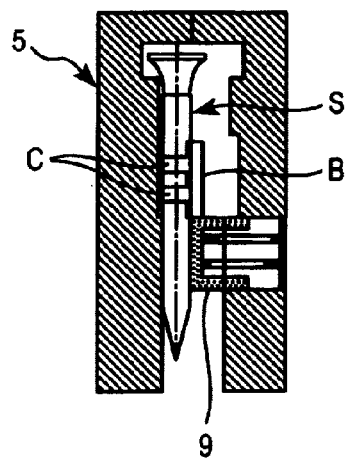
FIG. 3 shows a fastener magazine; (a) is an explanatory diagram for a state in which a thin connecting screw is loaded, and (b) is an explanatory diagram for a state in which a thick connecting screw is loaded.

As shown in FIG. 2(a), there is provided a pressing plate 9 of a spring pressing type which faces the feed pawl in the screw passage of the fastener magazine 5 and which is pressured by a spring 11. As shown in FIGS. 3(a), (b), the fastener magazine 5 has a wide fastener passage width so as to load a thick fastener as well. The pressing plate 9 is disposed at a height capable of placing the connecting belt B of the connecting screw S on the upper surface thereof. The pressing plate 9 presses the shaft part of the connecting screw S so as to thrust the same against the wall surface on the feed pawl 8 side, and the connecting belt B of the connecting screw S is placed and supported by the upper surface of the pressing plate 9. Therefore, as shown in FIGS. 3(a), (b), the screws of the various thickness can be supported at a predetermined height by having the distance from the upper end of the connecting screw S to the lower end surface of the connecting belt B constantly regardless of the screw size. Since the connecting screw S is thrust against the wall surface on the feed pawl 8 side, the engagement between the feed pawl 8 and the connecting screw S can be stabilized so as to improve the certainty of feeding the screw.

When the feed pawl 8 moves backward while elastically having contact with the shaft part of the connecting screw S, although the force in the receding direction is applied to the connecting screw S, as shown in FIG. 2(a), the backward movement of the connecting screw S is prevented by providing the pawl 10 to the pressing plate 9. In the case where the pawl 10 is not provided, the spring force of the pressing plate 9 should be made stronger accordingly in order to prevent the backward movement of the connecting screw. Further, although there is a risk of causing a trouble in feeding the screw because the friction resistance between the pressing plate 9 and the connecting screw S is increased as well if the spring force is strengthened, the backward movement of the connecting screw can be prevented with a weak spring force by providing the pawl 10 in the pressing plate 9. Moreover, the resistance at the time of feeding, loading or pulling off the connecting screw can be lowered by providing the pawl 10 in a angle shape as shown in the figure.

Figure 3B:
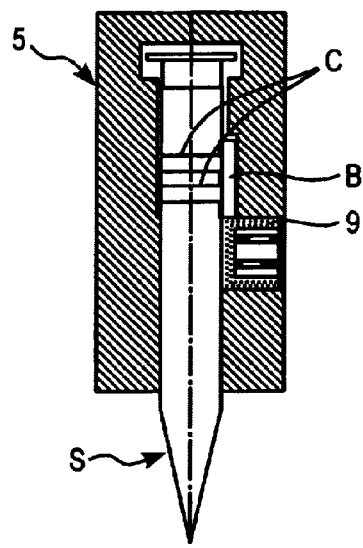
Figure 4A:
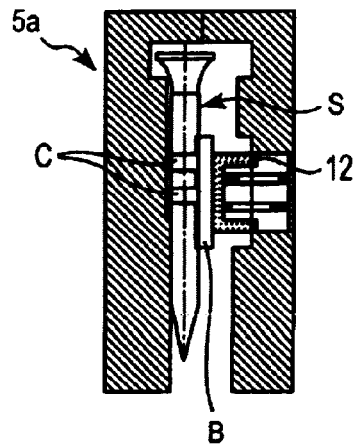
FIG. 4 shows a fastener magazine; (a) is an explanatory diagram for a state in which a thin connecting screw is loaded, and (b) is an explanatory diagram for a state in which a thick connecting screw is loaded.
Figure 4B:
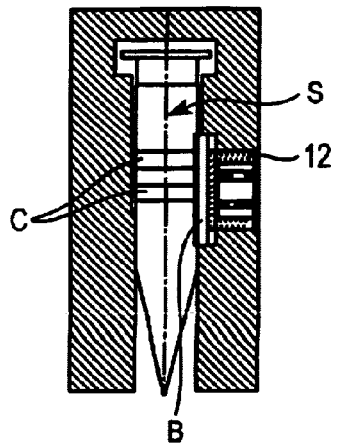

The fastener magazine 5a shown in FIGS. 4(a), (b) is configured such that the height of the pressing plate is changed from that of the fastener magazine 5 of FIG. 3 and the pressing plate 12 presses the connecting belt B of the connecting screw S. The friction resistance at the time of feeding the screw can be reduced by contacting the pressing plate 12 with the smooth connecting belt B, so that the feeding operation can further be made smoother. If the connecting screw S is loaded into the fastener magazine from the rear end opening of the fastener magazine 5a while positioning the head of the connecting screw S to the upper part width expanded part of the fastener passage, the connecting screw S is pressured against the wall surface on the feed pawl side (the left side in the figure) of the fastener passage by the pressing plate 12. Thereby, the connecting screw is loaded in a state in which one side of the screw head (feed pawl side) is hooked by the upper part width expanded part of the fastener passage so as to be supported at a predetermined height.

Figure 5A:
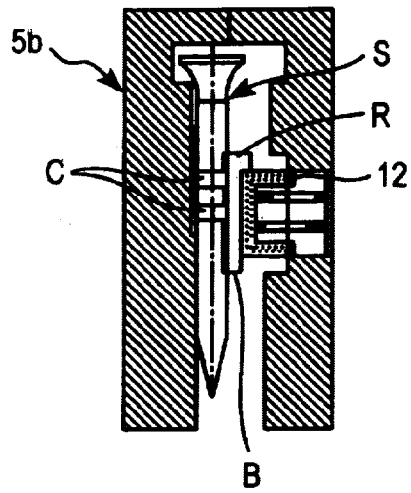
FIG. 5 shows a fastener magazine; (a) is an explanatory diagram for a state in which a thin connecting screw loaded, and (b) is an explanatory diagram for a state in which a thick connecting screw is loaded.
Figure 5B:
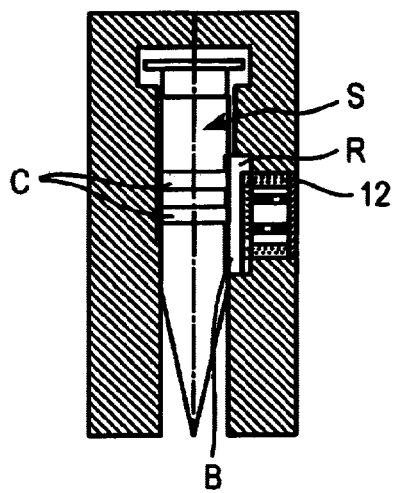

Moreover, as the fastener magazine 5b shown in FIGS. 5(a), (b), the support of the connecting screw S can further be secured if the fastener magazine has a configuration such that a rib R projecting from the upper end part or the middle part of the connecting belt B in the direction of pressing plate 12 is foamed and the rib R is placed on the upper surface of the pressing plate 12 so as to support the connecting screw S.

Figure 6A:
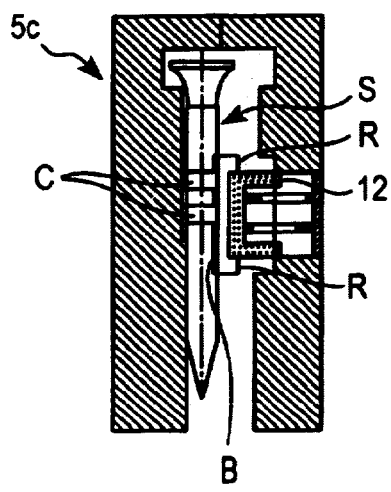
FIG. 6 shows a fastener magazine; (a) is an explanatory diagram for a state in which a thin connecting screw is loaded, and (b) is an explanatory diagram for a state in which a thick connecting screw is loaded.

Moreover, as the fastener magazine 5c shown in FIGS. 6(a), (b), by providing two ribs R projecting from the upper and lower both end parts of the connecting belt B in the direction of the pressing plate 12, and setting the distance between the upper and lower ribs R substantially equal to the height of the pressing plate 12, the pressing plate 12 enters between the upper and lower ribs R so as to limit the vertical movement of the connecting screw S, and thus the further highly accurate positioning can be expected. Since the holder part c for supporting the fasteners in the connecting belt B has a thin ring-like shape, there is a risk of the rupture of the holder part c in the configuration of pressuring the holder part c side by the pressing plate. However, since the contact area of the pressure member and the connecting belt is large in the configuration of pressuring the connecting belt, there is no risk of cutting of the connecting belt.

The fastener magazine 21 shown in FIG. 7 is provided with a guide groove 22 elongating in the front and rear both ends in the right wall surface (the surface facing the feed pawl) of the fastener passage such that the connecting belts 24a, 24b of the connecting fasteners 23a, 23b are engaged with the guide groove 22. There is provided a thin screw 25a in connecting fastener 23a shown in (a), and a thick screw 25b in the connecting fastener 23b shown in (b). However, the vertical width of the connecting belts 24a, 24b of the connecting fasteners 23a, 23b is substantially equal to the vertical width of the guide groove 22. The entire horizontal width of the connecting fasteners 23a, 23b is made substantially equal to the width of the space between the left wall surface on the feed pawl side and the vertical wall surface of the guide groove 22 by increasing or reducing the horizontal width of the connecting belts 24a, 24b according to the diameter of the fastener. Therefore, the connecting fastener 11 can be supported at a predetermined height regardless of the diameter of the fastener by engaging the connecting belts 24a, 24b of the connecting fasteners 23a, 23b with the guide groove 22.

Figure 6B:
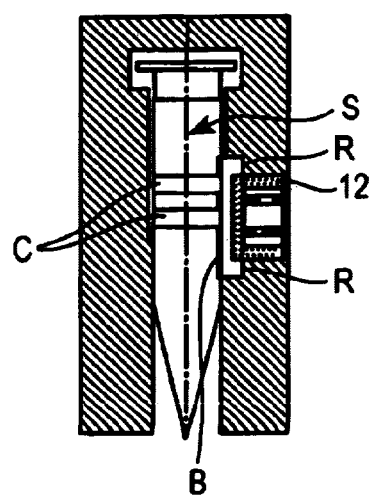

Accordingly, the fasteners of the various sizes can be supported stably at a constant height by having the entire horizontal width equally by increasing or reducing the thickness of the connecting belt according to the size of the fastener. Moreover, in the case of a fastener having a small diameter, if the entire horizontal width is adjusted by partially increasing the thickness of the connecting belt by the same rib as the connecting belt of FIG. 6, the amount of using the resin material of the connecting belt can be cut back, and the increase of the driving load at the time of fastening a screw or driving a nail can be avoided without deteriorating the flexibility.

The present invention is not limited to the above-mentioned embodiment, and various modifications can be made within the technological scope of the present invention, and naturally the present invention includes the modified embodiments as well.

As heretofore explained, according to the fastener magazine of the present invention, a fastener having a head diameter smaller than the width of the fastener passage can be loaded as well, and it can be supported stably at a constant height regardless of the head shape so that the fasteners of the various sizes and shapes can be used so as to provide the excellent versatility. Moreover, in the configuration of thrusting the connecting fastener against the wall surface on the feed pawl side by the pressing plate, the engagement between the feed pawl and the connecting screw can also be stabilized so that the certainty of feeding the screw can be improved.

Next, another embodiment of the fastening machine and the fastener according to the present invention will be explained with reference to FIGS. 8 to 11. In the explanation below, the function, the effect, or the like not explained particularly, are same except the points different in terms of the structure in the above-mentioned embodiment.

Figure 8B:
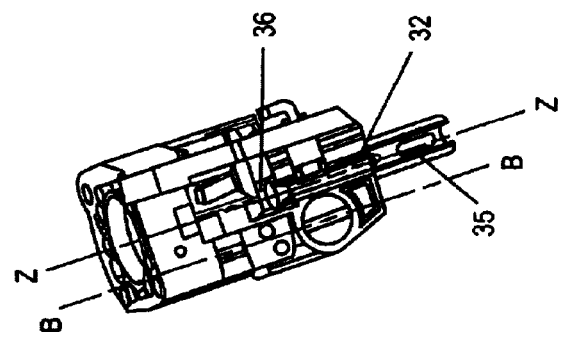
FIG. 8 shows a principal cross sectional view and a rear view of a fastening machine of another embodiment.
Figure 8A:
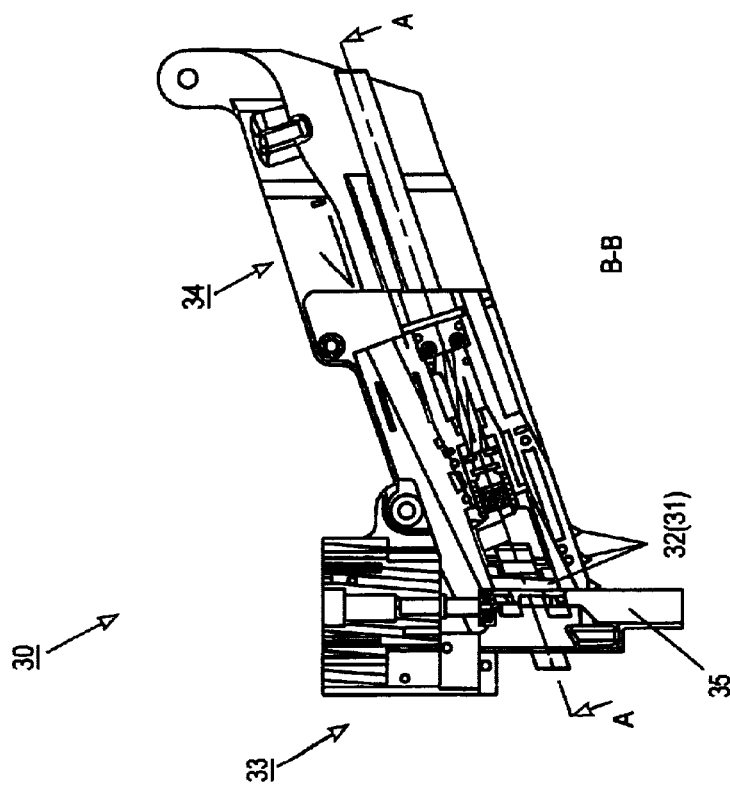

In FIG. 8, the numeral 30 represents a fastening machine for screwing a fastener 32 such as a screw and a nail of the loaded connecting fastener 31 to be explained later into the work (not shown). In particular, FIG. 8(a) is a cross sectional view taken along the line B—B in FIG. 8(b), and it shows the feeding mechanism of the connecting fastener 31 to be explained later from the side surface side. FIG. 8(b) is a rear view showing the fastening machine 30 from the rear part side.

The fastening machine 30 having the substantially same configuration as the above-mentioned screw fastening machine, comprises an ejection part 33 and a magazine 34. The ejection part 33 comprises an air cylinder and a driver bit (not shown), a nose 35 for allowing passage of the driver bit to eject a predetermined fastener, or the like.

Figure 9:
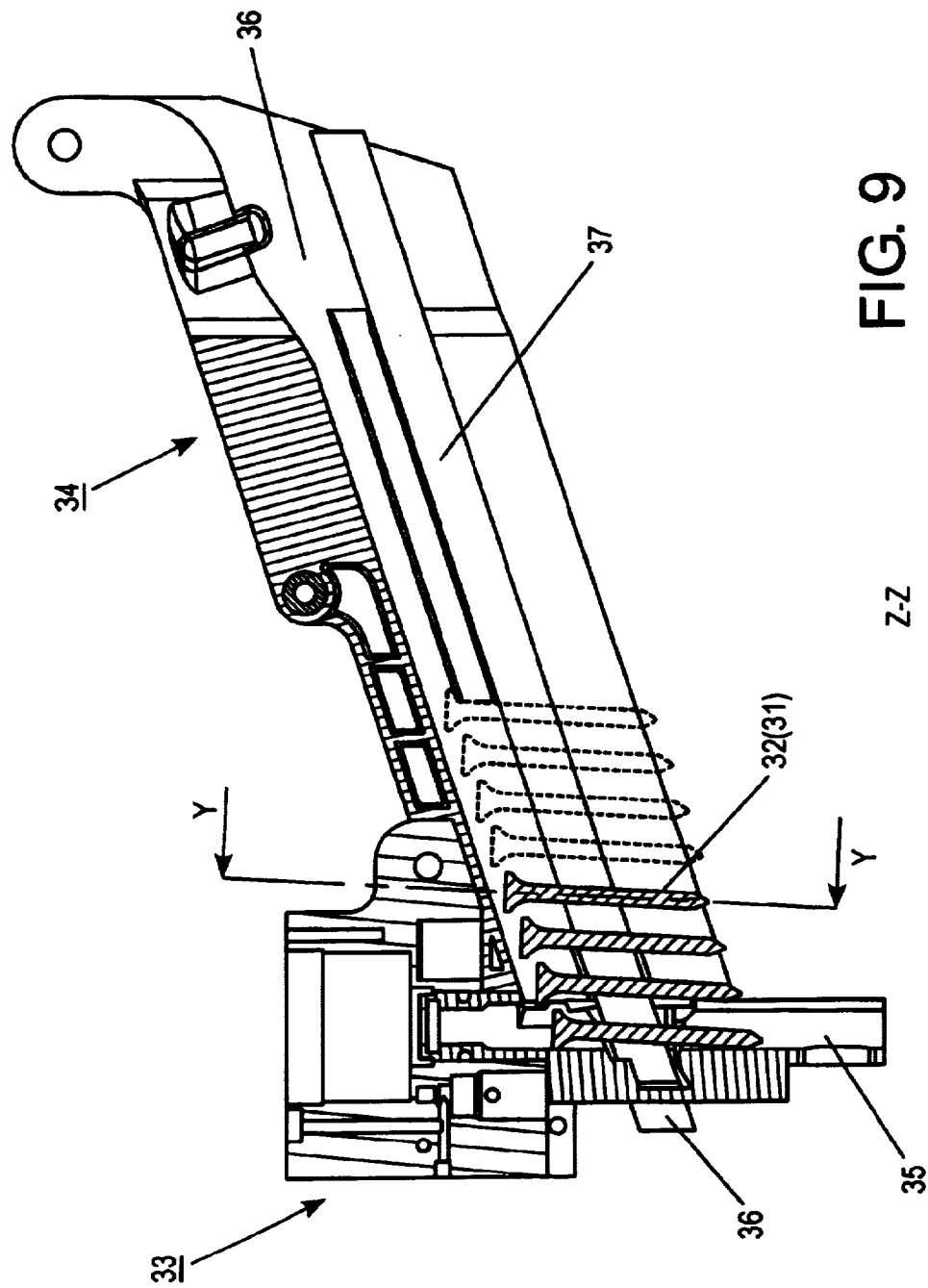
FIG. 9 is another principal cross sectional view of a fastening machine of another embodiment.

FIG. 9 is a cross sectional view taken along the line Z—Z of the rear view shown in FIG. 8(b), and it shows the part taken from the side surface by setting the passage (fastener passage) 36 of the fastener as the center. As shown in the same figure, the fasteners 32 are connected by the connecting belt 37 so as to provide the connecting fastener.

Figure 10A:
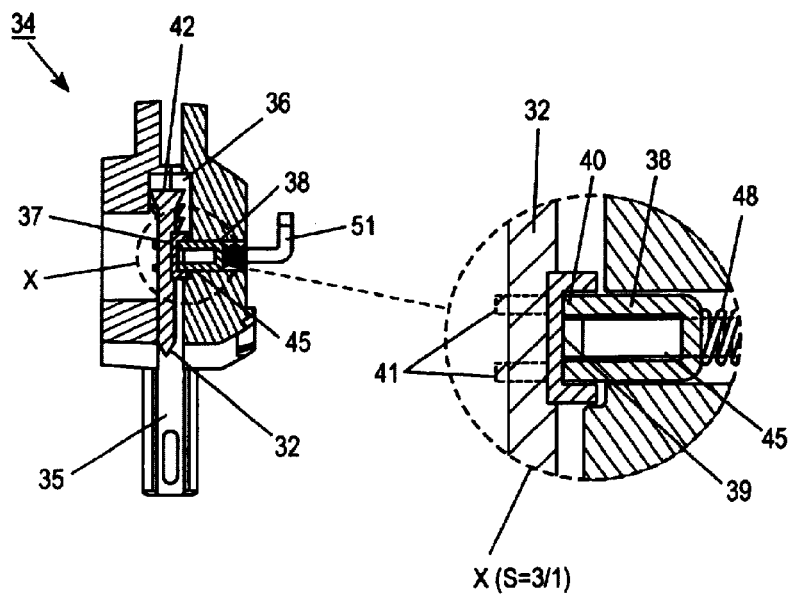
FIG. 10 is a cross sectional view of a magazine part of a fastening machine according to another embodiment.

FIG. 10(a) shows the Y—Y cross section in FIG. 9, and it shows the positional relationship between the shape of the passage 36 and the fastener 32. The figure is created in a simplified manner for the explanation, and thus the elements other than those concerning the passage 36, the fastener 32, and the pressuring member (pressure member) 38 for pressuring the fastener 32 against the side wall are omitted. Moreover, the circle part shown by X shows the relationship between the pressuring member 38 and the fastener 32 of the connecting belt 37 as an enlarged view. Moreover, FIG. 10(b) is a perspective view showing the single shape of the pressuring member 38.

The connecting belt 37 comprising the connecting fastener 31 has a C-shaped cross section as shown in the figure such that the concavity surface 39 in the dented part is contacted with the guide part 40 of the pressuring member 38. The side opposite to the concavity surface 39 of the connecting belt 37 is the fastener 32 mounting surface, provided with a ring-like mounting member 41 by a narrow band-like member made of a synthetic resin so that the fastener 32 is fixed by the mounting member 41. Moreover, the mounting operation is executed such that the positional relationship between the connecting belt 37 and the head top surface 42 of the fastener 32 is provided always constantly.

Figure 10B:
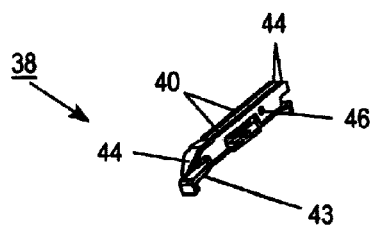

As shown in FIG. 10(b), the pressuring member 38 comprises the base plate 43 with a bent part formed at the both end parts in the longitudinal direction, with a side wall provided on both sides in the longitudinal direction of the base plate 43. The end rim of the side wall serves as the above-mentioned guide part 40. Moreover, the guide part 40 has a taper part 44 on its both ends so as to smoothly guide the connecting belt 37 of the connecting fastener 31 to the guide part when the connecting belt 37 enters the magazine 34.

The guide part 40 comprises two pieces of plate-like members (side walls) facing with each other, and a space having an opening to the connecting belt 37 side is provided between the two pieces of the plate-like members. In the space, a nonreturn member 45 of the connecting fastener 31 to be described later is provided rotatably around the shaft supported by the shaft hole 46 provided in the plate-like members.

Moreover, the base plate 43 is pressured to the connecting belt 37 side by the compression coil spring (hereinafter, referred as the "spring") 48. According to the function of the spring 48, the pressuring member 38 pressures the connecting belt 37 so as to thrust the fastener 32 against the side wall on the opposite side comprising the passage 36. As a result, the fastener 32 is conveyed to the ejection part 33 while maintaining a constant posture.

The nonreturn member 45 is an L-shaped member, having a saw-blade-like concavity and convexity 49 in a part such that the concavity and convexity 49 is engaged with the concavity surface 39 of the connecting belt 37. In this embodiment, the saw-blade-like concavity and convexity 50 is formed also in the concavity surface 39 in the same manner such that the concavity and convexity 49 of the nonreturn member 45 is engaged with the concavity and convexity 50 of the connecting belt 37 only in the direction for advancing forward the connecting fastener 31.

Moreover, the nonreturn member 45 comprises an operation lever 51 exposed to the outside of the fastening machine 30 such that the nonreturn member 45 can be rotated around the above-mentioned shaft 47 by operating the operation lever 51 in order to optionally release the engagement between the nonreturn member 45 and the connecting fastener 31.

Figure 11:
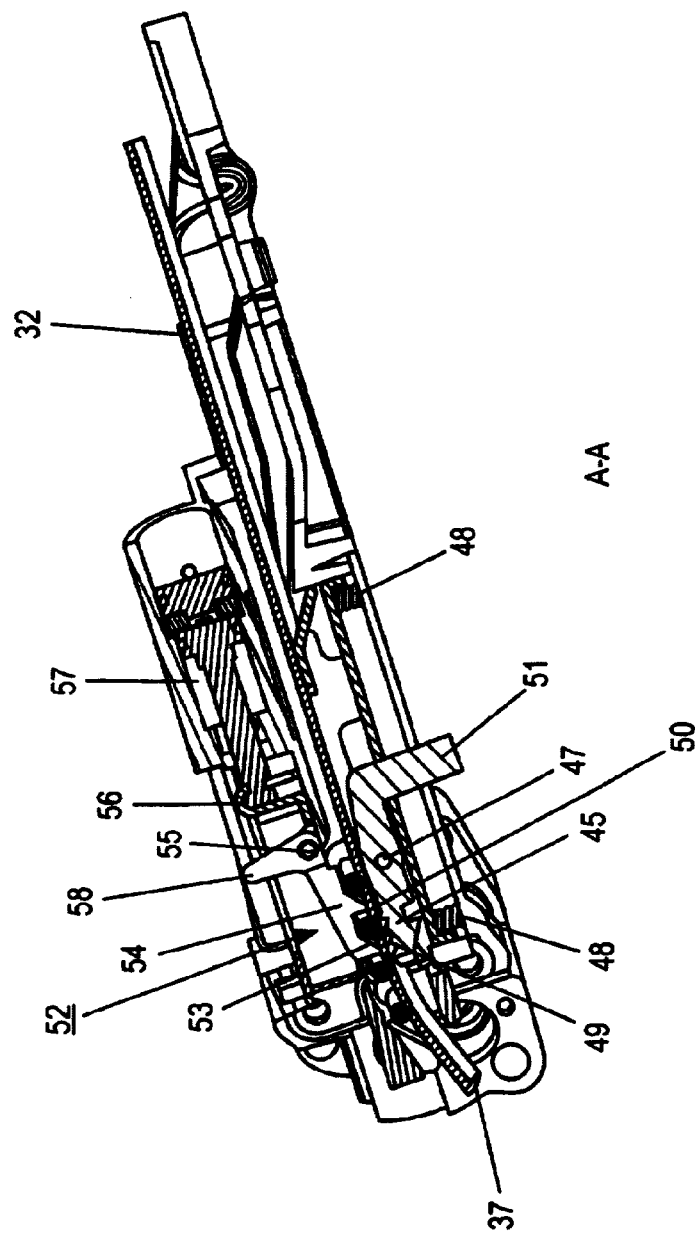
FIG. 11 is a plan principal cross sectional view of a fastening machine according to another embodiment.

Next, with reference to FIG. 11, the feeding mechanism 52 for advancing the loaded connecting fastener 31 in the fastening machine 30 will be explained.

The feeding mechanism 52 comprises a pawl member 54 having a fastener feed pawl 53, a driving member 56 having a shaft 55 for pivoting the pawl member 54 in the front and rear direction slidably and rotatably, and an air cylinder 57 for sliding the driving member 56.

The pawl 53 of the pawl member 54 is provided by two pieces with the same intervals as the arrangement of the fasteners 32 fixed on the connecting belt 37, and has substantially the same projection length as the shank diameter for entering between the fasteners in order to pressure the shank. Moreover, the pawl 53 is formed in a saw-blade-like shape so as to be engaged only in the direction for advancing the fastener 32 at the time of sliding the pawl member 54, and with respect to the opposite direction, the pawl 53 moves backward over the shank so as to return to the state before the pressing operation. Moreover, the pawl member 54 is forced by the spring (not shown) in the direction of contacting the pawl 53 with the fastener 53 in the shaft 55.

Moreover, an operation lever 58 exposed to the outside of the fastening machine 30 is provided on one end of the pawl member 54 such that the engagement between the pawl member 54 and the connecting fastener 31 can be released optionally by operating the operation lever 58.

According to the above-mentioned embodiment, since the connecting fastener 31 is pressured against the side wall on the opposite side by the pressuring member 38 provided on the side surface of the passage 36 so as to be projected, the fasteners can maintain the posture substantially upright without inclining in the right and left direction.

Moreover, the connecting fastener is fixed to the connecting belt 37 made of a soft synthetic resin. Although the connecting belt 37 can be bent relatively flexibly in the right and left direction, it can hardly be deformed in the vertical direction (in the wide width direction). In the case where the connecting belt is formed in C-shape with the ribs in the vertical direction, it can further hardly be deformed. The fastener 32 is fixed relatively firmly to the connecting belt 37 having such a characteristic so as not to be detached by some handling such as dropping and transportation. That is, unless the connecting belt 37 is bent in the vertical direction, the fastener 32 mounted to the connecting belt 37 cannot be bent easily in the vertical direction or the front and rear direction.

Then, since the connecting belt 37 sandwiches the pressuring member 38 to be contacted with the concavity surface 3 by the projecting rim-like ribs on its upper and lower both ends, it is limited by the pressuring member 38 so as not to be moved or bent in the vertical direction. Thereby, the fastener 32 cannot be moved in the vertical direction or inclined in the front and rear direction in the portion where the connecting belt 37 is guided by the pressuring member 38.

As mentioned above, according to the fastening machine 30 of this embodiment, since the movement of the fastener in the front and rear, and right and left directions can be limited by the pressuring member, the fastener can be supplied stably to the position to be ejected by the driver.

Moreover, according to the fasteners disclosed in the patent articles 1 to 3 mentioned as the conventional technology, since the fastener is supported only by the connecting belt, a position of the head top surface can hardly be stabilized with respect to the driver bit and this point has been the problem, however, according to this embodiment, the problem has been solved.

Moreover, according to the fastening machine 30 in this embodiment, the backward movement of the connecting fastener is prevented by providing the nonreturn member 45 for preventing the backward movement of the connecting fastener in the inside of the pressuring member in order to limit the backward movement of the connecting belt 37.

As a means for limiting the backward movement of the fastener, there is presented a means of directly engaging a nonreturn pawl with the shank part of the fastener for preventing the backward movement. One of the factors of the backward movement force is given such that the backward movement force is caused by the backward movement of the feed pawl of the fastener while being contacted with the shank at the time of returning to the initial position. Moreover, the backward movement force is applied to the rear fastener after being transmitted in the connecting belt 37. Therefore, since the force for preventing the backward movement is applied at a position different from the connecting belt on the same shank by being pressed backward by the connecting belt, the moment for rotating the shank is functioned. As a result, the fastener may not be supplied stably by the fastener posture fluctuation with respect to the connecting belt.

In contrast, according to this embodiment, since the nonreturn member 45 functions with respect to the connecting belt 37, the operation and effect of not changing the fastener posture by the operation of preventing the backward movement as mentioned above can be provided.

Moreover, in particular, according to this embodiment, the pawl 53 of the feeding mechanism diverges so as to be provided in the upper and lower sides and is engaged with the shank at the upper and lower both end positions of the connecting belt 37. Furthermore, in the positional relationship between the pawl 53 and the concavity and convexity 49 of the nonreturn member 45, both are substantially facing with each other. Therefore, the effect of stabilizing the fastener posture with respect to the connecting belt can be provided by this structure.

Moreover, since the structure is such that nonreturn member 45 is pivoted by the pressuring member 38 so as to have the nonreturn member 45 appear or disappear out of the pressuring member 38 with respect to the contact surface of the connecting belt 37, the effect of miniaturizing the apparatus can be provided.

Moreover, the pawl 53 comprising the feeding mechanism 52 is provided at a position opposed to a part of the pressuring member 38 across the fastener. Thereby, the fastener engagement by the pawl 53 can be executed certainly so that although the force is applied to the fastener to the backward movement direction when the pawl (pawl member 54) returns, the backward movement is prevented by the nonreturn member 45 provided in the inside of the pressuring member 38.

Moreover, both of the nonreturn member 45 and the pawl member 54 are operated from the outside to release the engagement with respect to the connecting fastener so that the operation for taking out the connecting fastener can be executed easily at the time of replacement of the fastener or in the event of jamming (choking, or the like).

The present invention provides a technology to be utilized for a magazine for loading a fastener in a fastener machine for driving the fasteners such as the screws and the nails.

The invention claimed is:

1. A combination comprising a fastener magazine of a fastening machine and a plurality of connected fasteners such as screws and nails arranged in parallel on a connecting belt, the fastener magazine for loading the connected fasteners,
   wherein the connecting belt has a concave surface formed on one side and a fastener mounting surface formed on the other side;
   wherein a pressing member of a pressing type is provided opposed to a feed pawl of a fastener feeding mechanism mounted on the fastener magazine across a fastener passage;
   wherein the pressing member contacts the concave surface of the connecting belt to support the connecting fastener and presses the connecting belt of the connected fasteners elastically so that the connected fasteners contact a wall surface of the fastener passage on the feed pawl side.

2. The combination of claim 1, wherein the pressing member is provided with a non-return member engaging with the connecting belt of the connected fasteners for preventing the backward movement of the connecting fastener.

3. A fastener magazine of a fastening machine for loading a plurality of connected fasteners arranged in parallel on a connecting belt, the fastener magazine comprising:
   a feed pawl of a fastener feeding mechanism mounted on the fastener magazine in a fastener passage;
   a pressing member of a pressing type is provided opposed to the feed pawl across the fastener passage;
   wherein the pressing member presses the connecting belt of the connected fasteners elastically so that the connected fasteners contact a wall surface on the feed pawl side of the fastener passage;
   wherein the pressing member is provided with a non-return member engaging with the connecting belt of the connected fasteners for preventing the backward movement of the connected fasteners;
   wherein a concavity and convexity is formed in the non-return member for engaging with the connecting belt only when the connected fasteners is going to move backward.

4. A fastener magazine of a fastening machine for loading a plurality of connected fasteners arranged in parallel on a connecting belt, the fastener magazine comprising:
   a feed pawl of a fastener feeding mechanism mounted on the fastener magazine in a fastener passage;
   a pressing member of a pressing type is provided opposed to the feed pawl across the fastener passage;
   wherein the pressing member presses the connecting belt of the connected fasteners elastically so that the connected fasteners contact the wall surface on the feed pawl side;
   wherein the pressing member is provided with a non-return member engaging with the connecting belt of the connected fasteners for preventing the backward movement of the connected fasteners;
   wherein the non-return member is rotatably mounted on the pressing member and has an operation lever exposed to the outside of the fastening machine;
   wherein the non-return member is engaged or disengaged with the connecting belt of the connected fasteners by the operation of the operation lever.

5. The fastener magazine of a fastening machine according to claim 4, wherein a concavity and convexity is formed in the non-return member for engaging with the connecting belt only when the connected fasteners are going to move backward.

* * * * *